(12) United States Patent
Cordery (10) Patent No.: US 11,703,607 B2
(45) Date of Patent: Jul. 18, 2023

(54) DETERMINING A SEISMIC QUALITY FACTOR FOR SUBSURFACE FORMATIONS FROM A SEISMIC SOURCE TO A FIRST VSP DOWNHOLE RECEIVER

(71) Applicant: Saudi Arabian Oil Company, Dhahran (SA)

(72) Inventor: Simon Cordery, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 370 days.

(21) Appl. No.: 16/901,914

(22) Filed: Jun. 15, 2020

(65) Prior Publication Data

US 2021/0389489 A1  Dec. 16, 2021

(51) Int. Cl.
*G01V 1/30* (2006.01)
*G01V 1/36* (2006.01)

(52) U.S. Cl.
CPC .............. *G01V 1/306* (2013.01); *G01V 1/368* (2013.01); *G01V 2210/161* (2013.01); *G01V 2210/677* (2013.01)

(58) Field of Classification Search
CPC ... G01V 1/306; G01V 1/368; G01V 2210/161
See application file for complete search history.

(56) References Cited

U.S. PATENT DOCUMENTS

| | | | |
|---|---|---|---|
| 5,400,299 A | 3/1995 | Trantham | |
| 5,479,376 A | 12/1995 | Gonzalez et al. | |
| 5,550,786 A | 8/1996 | Allen | |
| 5,555,218 A | 9/1996 | Chambers et al. | |
| 5,671,136 A | 9/1997 | Willhoit | |
| 6,021,090 A * | 2/2000 | Gaiser | G01V 1/364 367/101 |
| 6,738,715 B2 | 5/2004 | Shatilo et al. | |

(Continued)

FOREIGN PATENT DOCUMENTS

| | | |
|---|---|---|
| EP | 0911648 | 4/1999 |
| EP | 2075597 | 7/2009 |

OTHER PUBLICATIONS

Margrave, "Case study: measurement of Q and cumulative attenuation from VSP data", CREWES Research Report—vol. 28 (2016) (Year: 2016).*

(Continued)

*Primary Examiner* — Regis J Betsch
(74) *Attorney, Agent, or Firm* — Fish & Richardson P.C.

(57) ABSTRACT

A method or system is configured for determining a seismic attenuation quality factor Q for intervals of subsurface formations by performing actions including receiving vertical seismic profile traces. The actions include filtering the vertical seismic profile traces with an inverse impulse response of a downhole receiver. The actions include transforming the vertical seismic profile data from the particle motion measured by the downhole receiver to the far-field particle motions represented by the source wavelet. The actions include determining a ratio of the spectral amplitudes of the direct arrival event of the transformed vertical seismic profile data and the source Klauder wavelet. A quality factor Q is generated representing an attenuation of the seismic signal between the source at ground level surface and the downhole receiver.

20 Claims, 5 Drawing Sheets

(56) References Cited

U.S. PATENT DOCUMENTS

| | | | |
|---|---|---|---|
| 6,931,324 | B2 | 8/2005 | Taner et al. |
| 7,088,639 | B2 | 8/2006 | Walls et al. |
| 7,376,517 | B2 | 5/2008 | Rickett |
| 7,555,389 | B2 | 6/2009 | Cavalca et al. |
| 8,909,480 | B2 | 12/2014 | Wei et al. |
| 8,976,625 | B2 | 3/2015 | Blias |
| 9,075,163 | B2 | 7/2015 | Robertsson |
| 10,288,755 | B2 | 5/2019 | Cordery |
| 2006/0158962 | A1 | 7/2006 | Jeffryes |
| 2007/0064530 | A1 | 3/2007 | Moore |
| 2008/0157032 | A1 | 7/2008 | Sakata et al. |
| 2010/0097886 | A1 | 4/2010 | Day et al. |
| 2010/0211319 | A1 | 8/2010 | Manen et al. |
| 2012/0113747 | A1 | 5/2012 | Ferber |
| 2014/0336940 | A1 | 11/2014 | Bettinelli et al. |
| 2015/0117149 | A1 | 4/2015 | Edme et al. |
| 2015/0168573 | A1 | 6/2015 | Zhang et al. |
| 2015/0198728 | A1 | 7/2015 | Ollivrin |
| 2016/0091623 | A1 | 3/2016 | Yu et al. |
| 2016/0109592 | A1 | 4/2016 | Sun et al. |
| 2018/0284307 | A1* | 10/2018 | Cordery .................. G01V 1/30 |

OTHER PUBLICATIONS

Harris et al., "Q-compensation for High Resolution Seismic Imaging", VI Simpósio Brasileiro de Geofisica, 2014 (Year: 2014).*

Zhu et al., "Modeling acoustic wave propagation in heterogeneous attenuating media using decoupled fractional Laplacians" Geophysics, vol. 79, No. 3 (May-Jun. 2014); (Year: 2014).*

Chen et al., "Estimation of Q factors from reflection seismic data for a band-limited and stabilized inverse Q filter driven by an average-Q model", Journal of Applied Geophysics 101 (2014) 86-94 (Year: 2014).*

Cheng et al., "Comparison of Q-estimation methods: an update," CREWES Research Report, 2013, 25: 1-38.

Cheng et al., "Estimation of Q: a comparison of different computational methods," GeoConvention 2013: Integration, 2013, 4 pages.

Gupta, "Q Factor Analysis with Pilot Trace," HRDH 0697/ HDRH 0933, Saudi Aramco, Dec. 2016, 14 pages.

Tonn et al., "The determination of the seismic quality factor Q from VSP data: a comparison of different computational methods," Geophysical Prospecting, 1991, 39: 1-27.

Margrave et al., "Measurement of Q and cumulative attenuation from VSP data." May 2017, 4 pages.

PCT International Search Report and Written Opinion in International Appln. No. PCT/US2021/036584, dated Sep. 24, 2021, 16 pages.

* cited by examiner

DETERMINING A SEISMIC QUALITY FACTOR FOR SUBSURFACE FORMATIONS FROM A SEISMIC SOURCE TO A FIRST VSP DOWNHOLE RECEIVER

TECHNICAL FIELD

The present disclosure generally relates to an approach for identifying geologic features in subsurface formations including deriving seismic absorption quality factors (Q) from vertical seismic profiles (VSP's) for the interval from the seismic source to the first useable downhole receiver.

BACKGROUND

In reflection seismology, geologists and geophysicists perform seismic surveys to map and interpret geologic features, for example, identification of potential petroleum reservoirs. Seismic surveys are conducted by using a controlled seismic source (for example, a seismic vibrator or dynamite) to create a seismic wave. The seismic source is typically located at ground surface. The seismic wave propagates into the ground, is reflected by subsurface formations, and returns to the surface where it is recorded by geophone sensors. The wave amplitude is attenuated during propagation, by an amount that is a function of travel time, signal frequency and the seismic quality factor, Q. The geologists and geophysicists analyze the time it takes for the seismic waves to reflect off subsurface formations and return to the surface to map sedimentary facies and other geologic features. This analysis can also incorporate data from other sources, for example, borehole logging, gravity surveys, and magnetic surveys.

Methods to correct the seismic wavelet for the effect of attenuation include application of what is generally called an inverse-Q filter. This requires a quality factor model for the wave travel path. Q values can be determined from vertical seismic profiles (VSP's) using, for example, the spectral ratio method.

SUMMARY

This specification describes systems and methods for developing a quality factor (Q) model for intervals of a subsurface formation from a seismic source to the first useable logged receiver level of a VSP. This interval can be referred to as the overburden interval for the VSP, and this approach is an extension of existing methods that derive Q only over subsurface intervals between the VSP downhole receivers. In seismic modeling and analysis, the quality factor Q quantifies the energy loss of a propagating wavelet with time due to fluid movement and friction with grain boundary. This can also be referred to as a seismic attenuation factor. The effect can be referred to as Earth's absorption, and can be considered to be an undesired distortion to the signal wavelet.

Generally, Q models are used to remove the effects of Earth's absorption from surface seismic reflection data. This restores high-frequency signal amplitudes, leading to higher resolution images and better amplitude analysis of seismic data. A more accurate model improves this correction. This inverse-Q filtering uses Q values for the complete seismic ray path from the source location to receiver. A Q-model for entire seismic trace records is thus used to perform the correction. The process described in this specification provides the shallow Q-values that are otherwise missing from methods using VSP's, enabling more detailed and more accurate Q models for inverse-Q filtering of surface seismic data.

The data processing system and processes described can enable one or more of the following advantages. The data processing system is configured to provide a Q-value estimate for an overburden interval from the surface to a first useable downhole receiver. Generally, this Q-value estimate is not otherwise derived from VSPs. In some implementations, the overburden range can be a substantial distance, such as up to approximately 1000 meters (m). The derived overburden Q-values are more accurate than simply extrapolating values derived for the deeper logged intervals, which typically have higher Q values. The derived overburden Q-values enable a more accurate Q-model to be built for the purpose of processing surface seismic reflection data. The more accurate Q-model enables an accurate removal of the effect of Earth's absorption from the seismic signal, improving the seismic data for further interpretation analysis. In some implementations, the derived Q values can be incorporated in to the processing of surface seismic data for inverse-Q filtering.

In the present disclosure, a process for determining a seismic attenuation quality factor Q for intervals of subsurface formations includes receiving vertical seismic profile traces. In the present disclosure, the process includes filtering the vertical seismic profile traces with an inverse impulse response of a downhole receiver. In the present disclosure, the process includes transforming the filtered vertical seismic profile traces from particle motion measured by the downhole receiver to far-field particle motion represented by the source wavelet. The process includes determining a ratio of spectral amplitudes of a direct arrival event of the transformed vertical seismic profile traces and the source Klauder wavelet. The process includes generating, from the spectral ratio, a quality factor Q representing an attenuation of the vertical seismic profile traces between a source at ground level surface and the downhole receiver.

In some implementations, transforming the seismic signal includes transforming particle velocity data to particle displacement data. In some implementations, transforming the seismic signal is a time-integration, equivalent to a −6 dB/octave gain and a −90 degree phase shift. In some implementations, the ratio is defined by $$Q = -\pi\left(\frac{t_2 - t_1}{m}\right), m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is the natural logarithm, and m is the log of the ratio of the spectral amplitudes. In the present disclosure, $A_1$ is the source Klauder wavelet amplitude spectra at time $t_1=0$ seconds and depth $d_1=0$ meters, and $A_2$ is the amplitude spectra of the direct arrival event at time $t_2$ of the first useable downhole receiver from the ground level surface at depth $d_2=0$ meters.

In some implementations, the process includes processing surface seismic data to determine the seismic attenuation quality factor Q.

In the present disclosure, a system for determining a seismic attenuation quality factor Q for intervals of subsurface formations includes one or more processing devices and a memory storing instructions that, when executed by the one or more processing devices, cause the one or more processing devices to perform operations including receiving vertical seismic profile traces. In the present disclosure, the operations include filtering the vertical seismic profile traces with an inverse impulse response of a downhole receiver. In the present disclosure, the operations include transforming the filtered vertical seismic profile traces from particle motion measured by the downhole receiver to far-field particle motion represented by the source wavelet. In the present disclosure, the operations include determining a ratio of spectral amplitudes of a direct arrival event of the transformed vertical seismic profile traces and the source Klauder wavelet. In the present disclosure, the operations include generating, from the spectral ratio, a quality factor Q representing an attenuation of the vertical seismic profile traces between a source at ground level surface and the downhole receiver.

In some implementations, transforming the seismic signal includes transforming particle velocity data to particle displacement data. In some implementations, transforming the seismic signal is a time-integration, equivalent to a −6 dB/octave gain and a −90 degree phase shift. In some implementations, the ratio is defined by $$Q = -\pi\left(\frac{t_2 - t_1}{m}\right), m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is the natural logarithm, and m is the log of the ratio of the spectral amplitudes. In the present disclosure, $A_1$ is the source Klauder wavelet amplitude spectra at time $t_1=0$ seconds and depth $d_1=0$ meters, and $A_2$ is the amplitude spectra of the direct arrival event at time $t_2$ of the first useable downhole receiver from the ground level surface at depth $d_2=0$ meters.

In some implementations, the operations include processing surface seismic data to determine the seismic attenuation quality factor Q.

In the present disclosure, one or more computer readable media store instructions for determining a seismic attenuation quality factor Q for intervals of subsurface formations, the instructions, when executed by one or more processing devices, being configured to cause the one or more processing devices to perform operations including receiving vertical seismic profile traces. In the present disclosure, the operations include filtering the vertical seismic profile traces with an inverse impulse response of a downhole receiver. In the present disclosure, the operations include transforming the filtered vertical seismic profile traces from particle motion measured by the downhole receiver to far-field particle motion represented by the source wavelet. The operations include determining a ratio of spectral amplitudes of a direct arrival event of the transformed vertical seismic profile traces and the source Klauder wavelet. The operations include generating, from the spectral ratio, a quality factor Q representing an attenuation of the vertical seismic profile traces between a source at ground level surface and the downhole receiver.

In some implementations, transforming the seismic signal includes transforming particle velocity data to particle displacement data. In some implementations, transforming the seismic signal is a time-integration, equivalent to a −6 dB/octave gain and a −90 degree phase shift. In some implementations, the ratio is defined by $$Q = -\pi\left(\frac{t_2 - t_1}{m}\right), m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is the natural logarithm, and m is the log of the ratio of the spectral amplitudes. In the present disclosure, $A_1$ is the source Klauder wavelet amplitude spectra at time $t_1=0$ seconds and depth $d_1=0$ meters, and $A_2$ is the amplitude spectra of the direct arrival event at time $t_2$ of the first useable downhole receiver from the ground level surface at depth $d_2=0$ meters.

In the present disclosure, a process for determining a seismic attenuation quality factor Q for intervals of subsurface formations includes receiving vertical seismic profile traces. In the present disclosure, the process includes filtering the vertical seismic profile traces with an inverse impulse response of a downhole receiver. In the present disclosure, the process includes transforming the source Klauder wavelet from the far-field particle motion represented by the source wavelet to the particle motion measured by the vertical seismic profile downhole receivers. In the present disclosure, the process includes determining a spectral ratio of spectral amplitudes of a direct arrival event of the filtered vertical seismic profile traces and transformed source Klauder wavelet. In the present disclosure, the process includes generating, from the spectral ratio, a quality factor Q representing an attenuation of the vertical seismic profile traces between a source at ground level surface and the downhole receiver. In the present disclosure, the process includes processing surface seismic data to determine the seismic attenuation quality factor Q.

The details of one or more embodiments are set forth in the accompanying drawings and the description below. Other features and advantages will be apparent from the description and drawings, and from the claims.

DETAILED DESCRIPTION

This specification describes a workflow for, but not limited to, the spectral ratio method of deriving seismic absorption quality factors from VSP's to also give Q-values for the overburden interval from source to first useable logged depth interval. It is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

Generally, this document describes data processing systems and methods for generating quality factor (Q) models for the subsurface. Generally, Q represents a ratio of stored energy to dispersed energy, and measures a relative energy loss per oscillation cycle.

The data processing system is configured to remove the effects of Earth's absorption from surface seismic reflection data. Generally, when Q models are more accurate, removal of these absorption effects is improved. This can be called inverse-Q filtering. Inverse-Q filtering is determined using Q values for the complete seismic ray path from the source location to receiver. The data processing system can use a Q-model for entire seismic trace records, from surface to the deepest reflector. This includes overburden regions, which corresponds to the shallow portion of the model for the interval from the VSP source to the first useable VSP downhole receiver.

For Q derivation, the data processing system is configured to provide Q estimation values for the overburden region. This workflow is performed to derive Q-values for the interval from source located at the surface to first useable VSP receiver, which would generally otherwise be estimated by extrapolation from deeper Q-values. In other words, the workflow generates the missing shallow Q-values, enabling more detailed and more accurate Q models required for inverse-Q filtering of surface seismic data.

The processes that are subsequently described are configured to expand a spectral ratio method of deriving Q (the seismic absorption quality factors) from VSPs to give an estimate of Q for the overburden interval from source to first useable logged depth level.

Generally, downhole VSP receivers are either geophones (such as particle velocity meters) or accelerometers (particle acceleration meters). In the case of the later, the acceleration traces are typically transformed to velocity by removal of the accelerometer impulse response (the response to an acceleration impulse) and time-integration to velocity. If geophone sensors are used, an inverse filter is applied to remove the geophone impulse response (the response of a geophone to a velocity impulse). A Vibroseis source has a far-field particle displacement that is proportional to the sweep ground force. In the present disclosure, the data processing system transfers the particle motion of the receiver to that of the Vibroseis source by time-integration to displacement.

In some implementations, a data processing system uses a spectral ratio method to derive Q-values over logged downhole intervals to derive Q from VSPs. With the assumption that seismic event boundaries have white reflectivity, the Q factor between VSP receivers is function of the log of the spectral ratios of the direct arrivals recorded at each receiver. In the present disclosure, a data processing system improves on this approach by transferring the particle motion recorded by the downhole receivers to that of the seismic source signal (such as a Vibroseis pilot sweep). The log of the ratio of the spectra of the source pilot and downhole receiver direct arrival then becomes a function of the effective Q for the interval from source to receiver. The data processing system can hence determine Q for the intervening overburden.

Generally, the data processing system (such as a computer systems 124 subsequently described in relation to FIG. 1) can be configured to provide a Q-value estimate for the overburden interval from surface to the first useable downhole receiver. Typically, the Q-value for the overburden interval is not derived from VSPs, but rather Q-values for the overburden interval are extrapolated from the deeper logged values of one or more wellbores. Deriving the Q-values for the overburden interval is more accurate than simply extrapolating deeper values because the deeper logged intervals typically have higher Q values that are not representative of the overburden interval. Deriving the Q-values for the overburden interval enables a more accurate Q-model to be built for the purpose of processing surface seismic reflection data by the data processing system.

Figure 1:
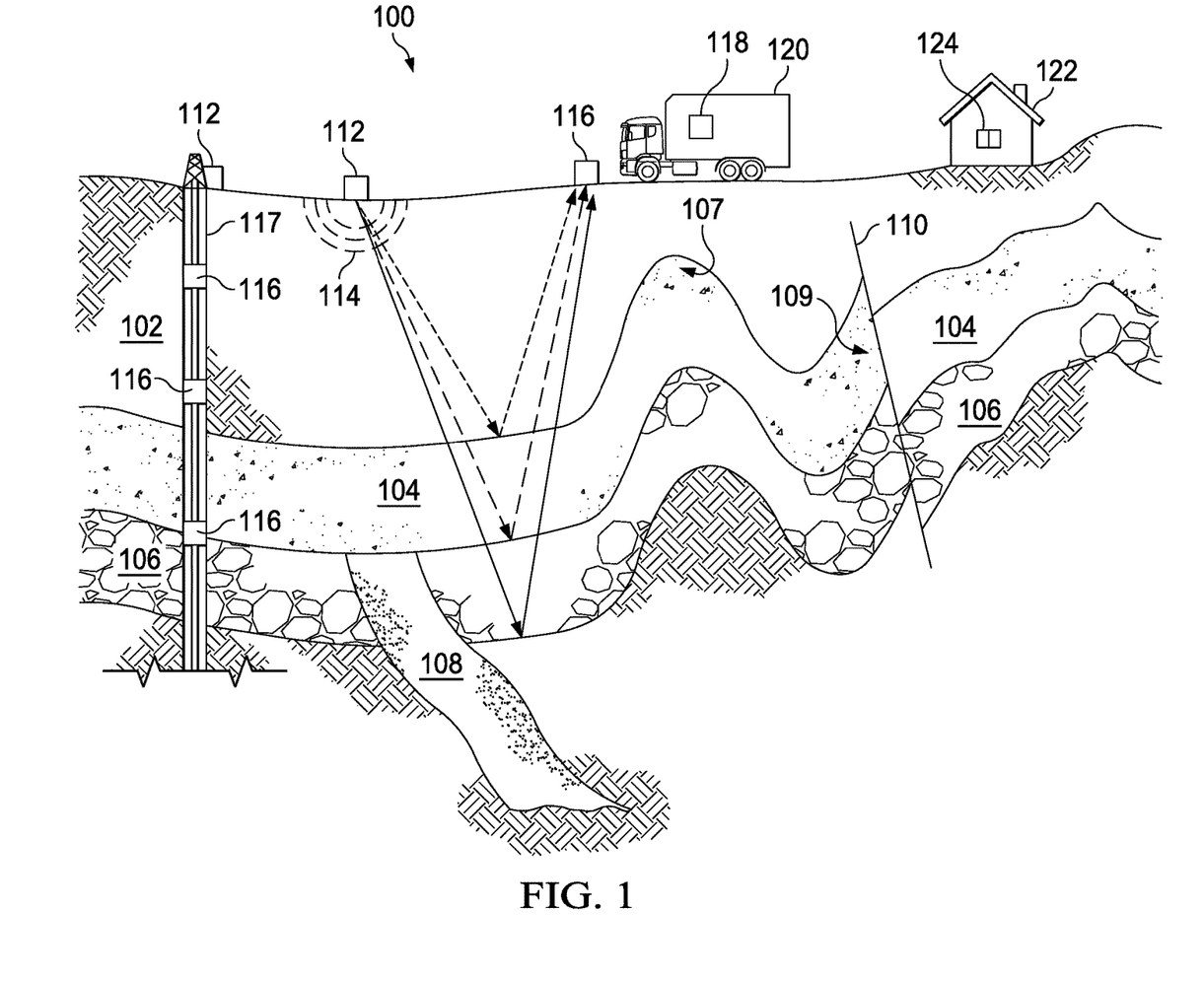
FIG. 1 is a schematic view of a seismic survey being performed to map subsurface features such as facies and faults.

FIG. 1 is a schematic view of a seismic survey being performed to map subsurface features. The subsurface formation 100 includes a layer of impermeable cap rock 102 at the surface and multiple underlying layers 104, 106, and 108. A fault line 110 extends across the subsurface formation.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and diminish as they get further from the surface.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

In some situations, seismic surveys include vertical seismic profiles, a technique of seismic measurements used for correlation with surface seismic data. In a vertical seismic profile, either the energy source, the detectors, or both are in a wellbore (e.g., wellbore 117). For example, sensors in a well borehole record reflected seismic energy originating from a seismic source at the surface. There are numerous methods for acquiring a vertical seismic profile (VSP). For example, zero-offset VSPs have sources close to the wellbore directly above the sensors; offset VSPs have sources some distance from sensors in a wellbore; and walkaway VSPs feature a source that is moved progressively farther offset from sensors in a fixed location. For example, a zero-offset VSP could be generated by an energy source located at the surface adjacent the wellbore 117 and detectors located downhole in the wellbore 117.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subsurface formation 100. Alternatively, the computer systems 124 can be located in a different location than the control center 122. Some computer systems are provided with functionality for manipulating and analyzing the data, such as performing seismic interpretation.

In some embodiments, results generated by the computer systems 124 may be displayed for user viewing using local or remote monitors or other display units. One approach to analyzing seismic data is to associate the data with portions of a seismic cube representing represent the subsurface formation 100. The seismic cube can also be display results of the analysis of the seismic data associated with the seismic survey.

Figure 2:
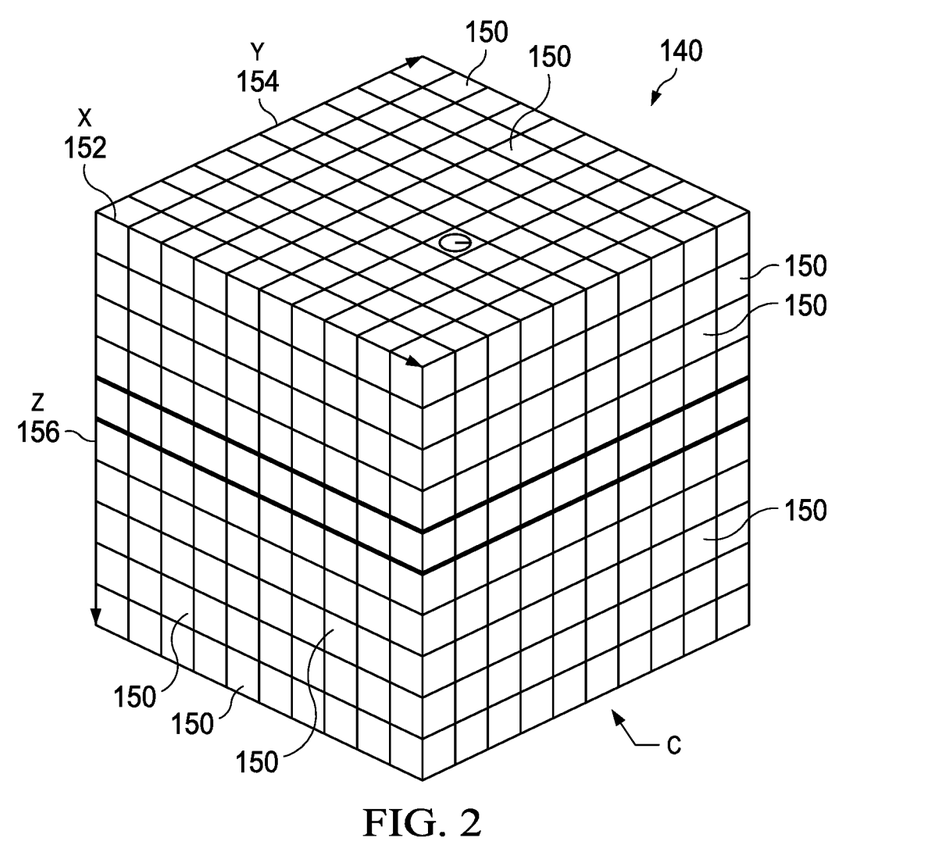
FIG. 2 illustrates a three-dimensional cube representation of the subsurface.

FIG. 2 illustrates a seismic cube 140 representing at least a portion of the subsurface formation 100. The seismic cube 140 is composed of a number of voxels 150. A voxel is a volume element, and each voxel corresponds, for example, with a seismic sample along a seismic trace.

Figure 3:
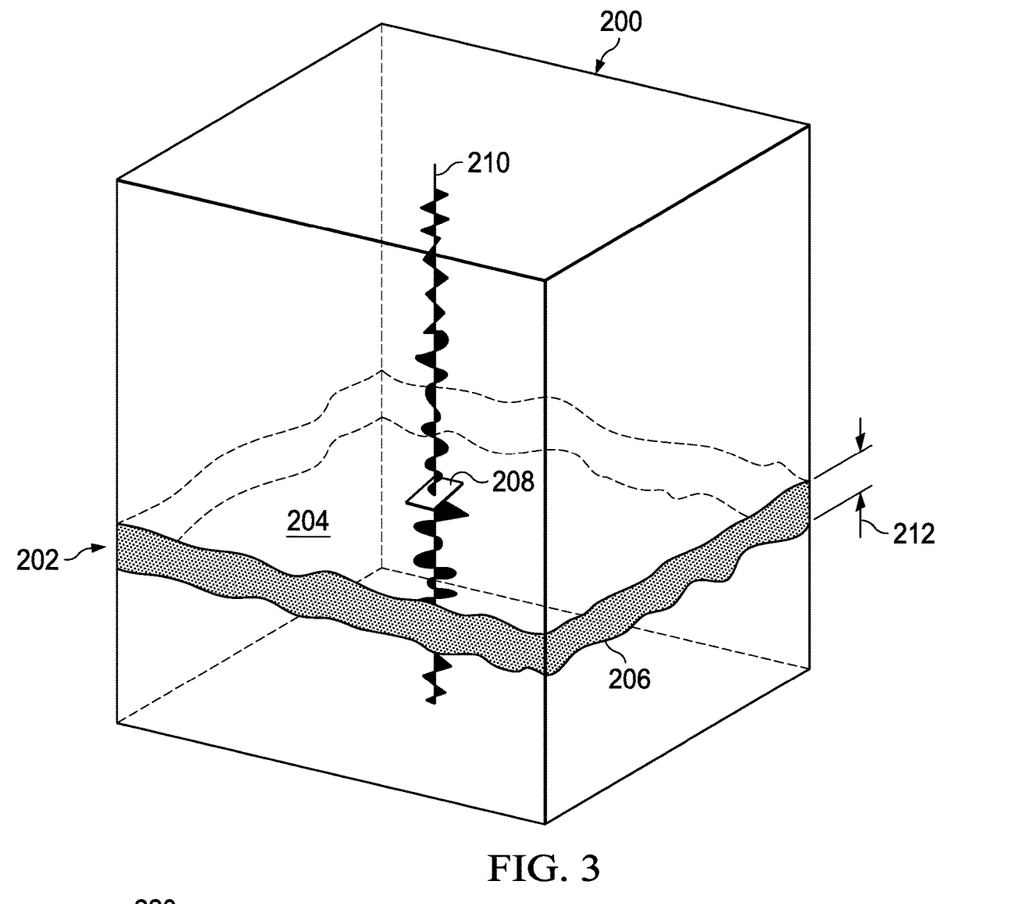
FIG. 3 illustrates a seismic trace within the three-dimensional cube of FIG. 2.

FIG. 3 illustrates a seismic cube 200 representing a formation. Although the illustrated three-dimensional volume is represented as a cube, subsurface formations can also be represented points arranged in configurations other than cubes. Each cell is a sample of a seismic trace representing an acoustic wave. Each seismic trace has an x-coordinate and a y-coordinate, and each data point of the trace is a seismic amplitude corresponding to a certain seismic travel time or depth (t or z). The amplitude of a seismic trace sample is assigned to the corresponding cell, for example cell 208. This assignment process is repeated for all of the cells to generate the seismic cube 200. This specification discusses applications in which the three-dimensional volume includes a quality factor that quantifies the energy loss of a propagating wavelet with time due to fluid movement and friction with grain boundaries.

This specification discusses applications in which the particle motion measured by the downhole receiver sensor is transferred to the particle motion represented by the Vibroseis source, such that the source pilot wavelet can be used as a reference trace at the source location (generally the ground level at zero meter depth) for deriving the quality factor Q to the downhole receivers.

Figure 4A:
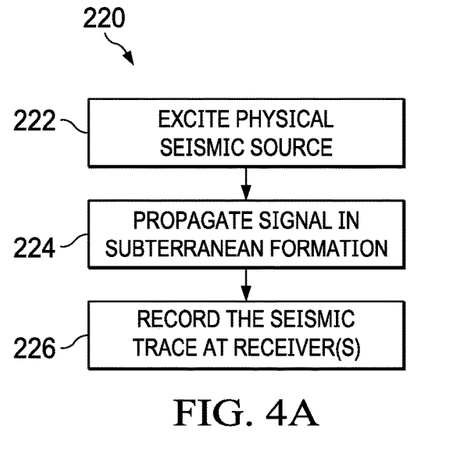
FIG. 4A-4B are flow diagrams of example processes for determining a seismic attenuation factor Q for subsurface formations from a seismic source to a first VSP downhole receiver.
Figure 4B:
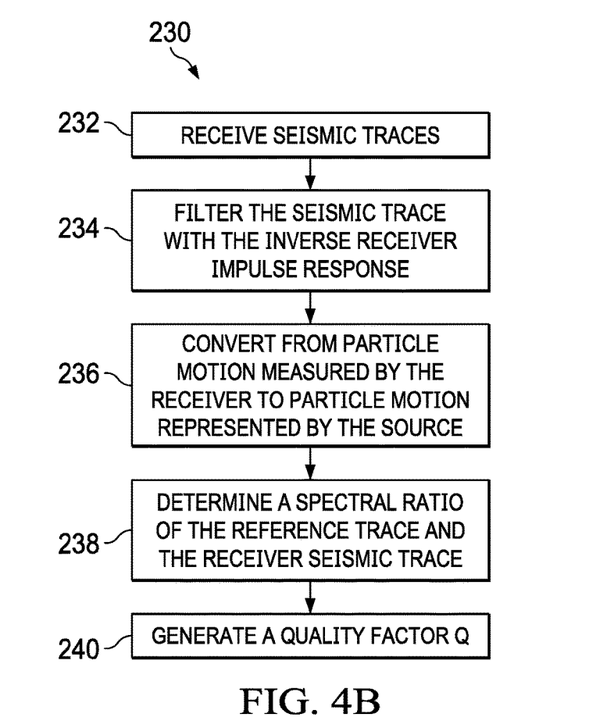
Figure 5:
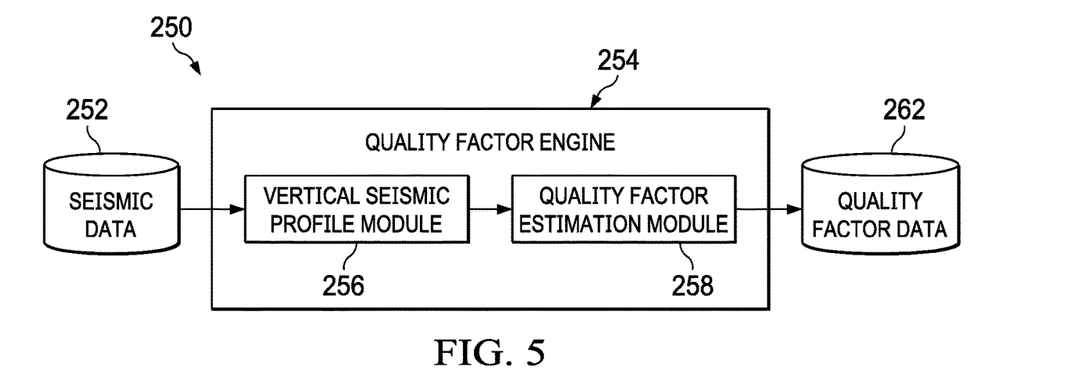
FIG. 5 shows a block diagram of an example system for generating Q-values from a Vibroseis sweep and recorded seismic traces.

FIGS. 4A-4B illustrate flow diagrams including example processes 220 and 230, respectively, for determining a seismic attenuation factor (Q) for subsurface intervals. FIG. 5 shows a data processing system 250 for determining Q for subsurface intervals. The data processing system 250 of FIG. 5 is configured to execute the processes 220 and 230 of FIGS. 4A-4B.

Turning to FIG. 4A, a process 220 performed by a physical acquisition system (such as a part of system described in relation to FIG. 1) is shown. One or more sources (such as source 112 in the wellbore 117 of FIG. 1) are excited (222) to generate a seismic signal in the formation 100. The seismic trace propagates (224) through subsurface 100 and is recorded (226) at receiver(s) (such as receivers 116 in the wellbore 117 of FIG. 1).

FIG. 4B shows a process 230 for determining a seismic attenuation factor for the overburden formations. The recorded signal at the receiver and a numerical representation of the generated signal at the source can be used by the data processing system 250 of FIG. 5 to perform process 230 of FIG. 4B. In an aspect, a quality factor engine 254 of the data processing system 250 is configured to receive the seismic data 252 and generate Q factor values data 262 of the intervals using a series of modules. The quality factor engine 254 can include a vertical seismic profile module 256, and a quality factor estimation module 258.

The data processing system 250 (such as computer 124 of FIG. 1) receives (232) a recorded seismic trace and seismic source signal. The receiver impulse response is removed from the recorded seismic trace by application (234) of an inverse receiver impulse response filter. The seismic source signal is an auto-correlated Vibroseis sweep, which is also called a source Klauder wavelet. The data processing system is configured to transform (236) the filtered seismic trace (234) from the particle motion measured by the receiver to the far-field particle motion represented by the source wavelet. For a Vibroseis source recorded by geophones, the data processing system converts (236) the seismic data from particle velocity data to particle displacement data. This is a time-integration operation, and equates to a negative 6 dB/octave gain and a negative 90-degree phase shift.

In some implementations, rather than transforming the receiver motion to match the source motion, the source motion can be transformed to match the receiver motion. For example, the far-field particle motion represented by the source wavelet is transformed into particle motion data represented by the downhole receiver, to generate a reference signal. Either approach can be used to prepare the data for quality factor estimation using a spectral ratio of the source and receiver data.

The data processing system 250 is configured to apply a spectral ratio method previously described, such as by the quality factor estimation module 258. The data processing system 250 determines (238) the spectral ratio of the spectra of the reference trace and the seismic trace. For example, the spectral ratio of the amplitudes of the source pilot Klauder wavelet and the direct arrival event of the transformed receiver seismic trace of the first useable downhole receiver are obtained. In some implementations, the data processing system can use the measured Vibroseis Klauder wavelet in place of the pilot if such data are available. The data processing system 250 generates (240) a value for the quality factor Q, such as by quality factor estimation module 258. The Q factor can represent an attenuation of the seismic trace. The estimates of the Q-factor values are for the intervals between the source and receivers. In some implementations, a format of this estimate can include a series of numerical values of depth or time and the respective Q values. In some implementations, the Q model can be represented by a voxel volume of FIG. 2.

Generally, seismic source far-field particle displacement values are understood to be proportional to the Vibroseis ground force (from standard Vibroseis theory), whereas the geophone receivers measure particle velocity.

In some implementations, this process to extend the spectral ratio method derivation is used on surface reflection seismic data. The ratio of the spectra of the seismic source wavelet and the spectra of a time-window of surface seismic provides Q-values for the interval between the surface and center of the time-window.

In an embodiment, zero-offset VSP downgoing-P energy direct arrivals are analyzed for Q estimation. Here, Q analysis is performed using a spectral ratio. In practice, for reliable Q values, the process ensures that there is geophone coupling with the formation and that there is good cement behind casing and consistent source signature. The spectral ratio is computed to determine the attenuation or Q factor, for each depth trace with respect to the selected reference trace with-in the desired frequency bandwidth, from the downgoing-P energy direct arrival.

Generally, the spectral ratio method for determining Q factors uses Equation (1) and Equation (2)

$$Q = -\pi\left(\frac{t_2 - t_1}{m}\right) \quad (1)$$

$$m = \ln\left(\frac{A_2(f)}{A_1(f)}\right) \quad (2)$$

where $A_1$ and $A_2$ are the spectral amplitudes for direct arrivals at travel times $t_1$ and $t_2$ recorded by receivers at depths $d_1$ and $d_2$, f is frequency, ln is the natural logarithm, and m is the log of the ratio of the spectral amplitudes. m is obtained by measuring the slope of the line fitted (such as using a least square method) to the log of the spectral amplitude ratios plotted as a function of frequency. These give an interval Q factor between $d_1$ and $d_2$. The minimum and maximum frequencies for this spectral ratio method are determined by inspection. In some implementations, the frequencies can be approximately 10 to 50 Hz. The frequencies can vary depending on the source sweep specifications and noise content. To fit straight lines to these spectral ratios, noisy band edges are generally avoided. The recorded trace at $d_1$ can be called a reference trace.

In the present disclosure for determining the Q factor for the overburden from the source at surface to the first downhole receiver, the reference trace is the source Klauder wavelet, $A_1$ is the Klauder wavelet amplitude spectra at time $t_1=0$ seconds and depth $d_1=0$ meters, and $A_2$ is the amplitude spectra of the direct arrival event at time $t_2$ of the first useable downhole receiver from the ground level surface at depth $d_2=0$ meters.

Figure 6:
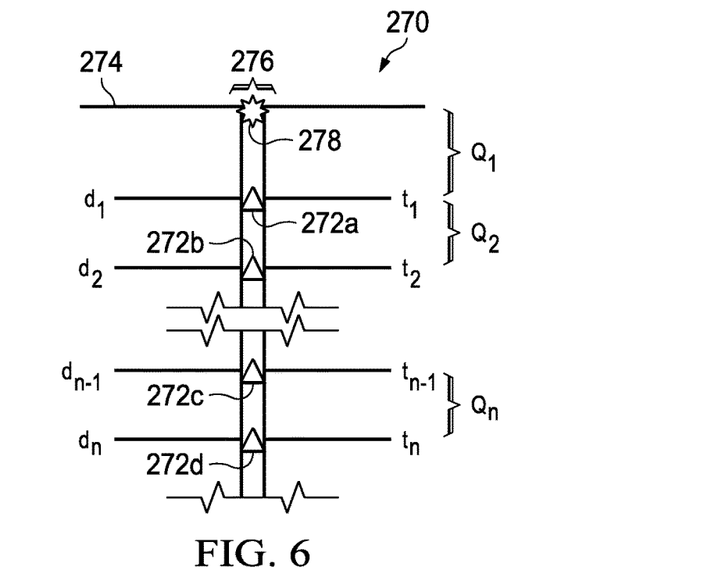
FIG. 6 shows an example of a Q model.

FIG. 6 shows an example of a Q model 270 that is generated as a result of the processes described in reference to FIGS. 4A-5, above. Wellbore 276 is present in the seismic environment, similar to wellbore 117 of FIG. 1. Source 278 (similar to source 112) and receiver sensors 272a-d (similar to sensors 116) are placed at or in the wellbore 276. Sensor 272a is at depth $d_1$, 272b is at depth $d_2$, and so forth until the nth sensor 272d at depth $d_n$. Any number of sensors 272 can be included, but four sensors are shown for illustrative purposes. Distances $d_1$-$d_n$ can be deeper than 1 kilometer. For each interval between receivers 272a-d, an interval Q value and associated time t are generated for the wellbore to generate a wellbore profile. This can be performed using Equations 1 and 2 as previously discussed. The number n of $Q_n$ values is based on the number n of sensors 272. As previously stated, the Q values $\{Q_1, t_1, Q_2, t_2, \ldots Q_n, t_n\}$ can form a model that is a number sequence or a more complex representation such as the 3-dimensional model of FIG. 2.

Figure 7:
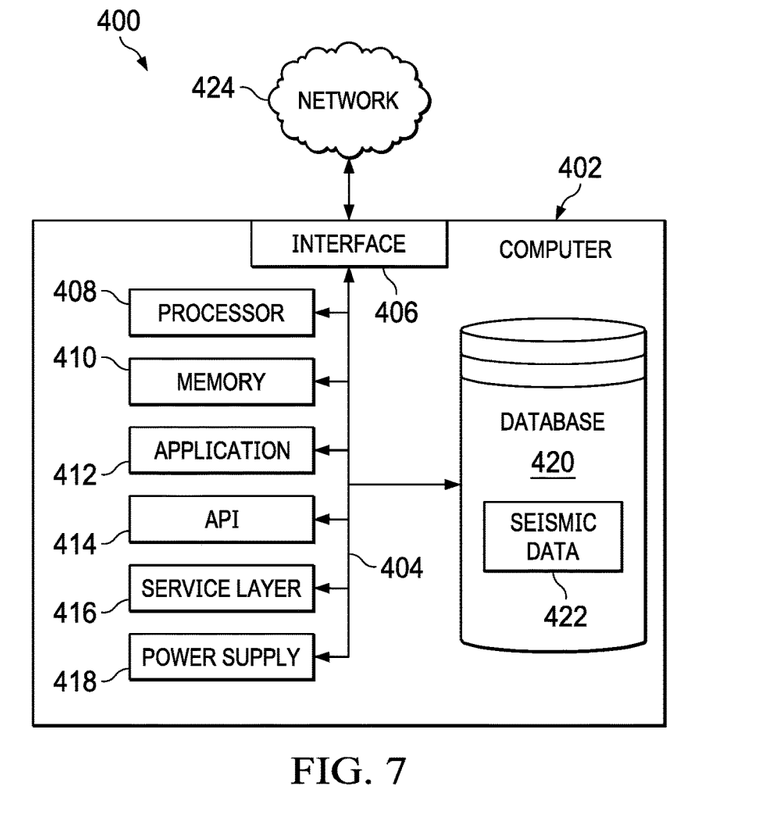
FIG. 7 is a diagram of an example computing system.

FIG. 7 is a block diagram of an example computing system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 424. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 424 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 404. In some implementations, any or all of the components of the computer 402, including hardware or software components, can interface with each other or the interface 406 (or a combination of both), over the system bus 404. Interfaces can use an application programming interface (API) 414, a service layer 416, or a combination of the API 414 and service layer 416. The API 414 can include specifications for routines, data structures, and object classes. The API 414 can be either computer-language independent or dependent. The API 414 can refer to a complete interface, a single function, or a set of APIs.

The service layer 416 can provide software services to the computer 402 and other components (whether illustrated or not) that are communicably coupled to the computer 402. The functionality of the computer 402 can be accessible for all service consumers using this service layer. Software services, such as those provided by the service layer 416, can provide reusable, defined functionalities through a defined interface. For example, the interface can be software written in JAVA, C++, or a language providing data in extensible markup language (XML) format. While illustrated as an integrated component of the computer 402, in alternative implementations, the API 414 or the service layer 416 can be stand-alone components in relation to other components of the computer 402 and other components communicably coupled to the computer 402. Moreover, any or all parts of the API 414 or the service layer 416 can be implemented as child or sub-modules of another software module, enterprise application, or hardware module without departing from the scope of the present disclosure.

The computer 402 includes an interface 406. Although illustrated as a single interface 406 in FIG. 17, two or more interfaces 406 can be used according to particular needs, desires, or particular implementations of the computer 402 and the described functionality. The interface 406 can be used by the computer 402 for communicating with other systems that are connected to the network 424 (whether illustrated or not) in a distributed environment. Generally, the interface 406 can include, or be implemented using, logic encoded in software or hardware (or a combination of software and hardware) operable to communicate with the network 424. More specifically, the interface 406 can include software supporting one or more communication protocols associated with communications. As such, the network 424 or the hardware of the interface can be operable to communicate physical signals within and outside of the illustrated computer 402.

The computer 402 includes a processor 408. Although illustrated as a single processor 408 in FIG. 7, two or more processors 408 can be used according to particular needs, desires, or particular implementations of the computer 402 and the described functionality. Generally, the processor 408 can execute instructions and can manipulate data to perform the operations of the computer 402, including operations using algorithms, methods, functions, processes, flows, and procedures as described in the present disclosure.

The computer 402 also includes a database 420 that can hold data (for example, seismic data 422) for the computer 402 and other components connected to the network 424 (whether illustrated or not). For example, database 420 can be an in-memory, conventional, or a database storing data consistent with the present disclosure. In some implementations, database 420 can be a combination of two or more different database types (for example, hybrid in-memory and conventional databases) according to particular needs, desires, or particular implementations of the computer 402 and the described functionality. Although illustrated as a single database 420 in FIG. 17, two or more databases (of the same, different, or combination of types) can be used according to particular needs, desires, or particular implementations of the computer 402 and the described functionality. While database 420 is illustrated as an internal component of the computer 402, in alternative implementations, database 420 can be external to the computer 402.

The computer 402 also includes a memory 410 that can hold data for the computer 402 or a combination of components connected to the network 424 (whether illustrated or not). Memory 410 can store any data consistent with the present disclosure. In some implementations, memory 410 can be a combination of two or more different types of memory (for example, a combination of semiconductor and magnetic storage) according to particular needs, desires, or particular implementations of the computer 402 and the described functionality. Although illustrated as a single memory 410 in FIG. 17, two or more memories 410 (of the same, different, or combination of types) can be used according to particular needs, desires, or particular implementations of the computer 402 and the described functionality. While memory 410 is illustrated as an internal component of the computer 402, in alternative implementations, memory 410 can be external to the computer 402.

The application 412 can be an algorithmic software engine providing functionality according to particular needs, desires, or particular implementations of the computer 402 and the described functionality. For example, application 412 can serve as one or more components, modules, or applications. Further, although illustrated as a single application 412, the application 412 can be implemented as multiple applications 412 on the computer 402. In addition, although illustrated as internal to the computer 402, in alternative implementations, the application 412 can be external to the computer 402.

The computer 402 can also include a power supply 418. The power supply 418 can include a rechargeable or non-rechargeable battery that can be configured to be either user- or non-user-replaceable. In some implementations, the power supply 418 can include power-conversion and management circuits, including recharging, standby, and power management functionalities. In some implementations, the power-supply 418 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 424. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system previously described. Accordingly, other embodiments are within the scope of the following claims.

What is claimed is:

1. A method for determining a seismic quality factor Q for intervals of subsurface formations, the method comprising:
    receiving vertical seismic profile traces;
    filtering the vertical seismic profile traces with an inverse impulse response of a downhole receiver;
    transforming the filtered vertical seismic profile traces from particle motion measured by the downhole receiver to far-field particle motion represented by a source wavelet;
    determining a ratio of spectral amplitudes of a direct arrival event of the transformed vertical seismic profile traces and the source wavelet; and
    generating, from the spectral ratio, a value for a quality factor Q representing an attenuation of the vertical seismic profile traces between a source at ground level surface and the downhole receiver;
    generating, based on the value of the quality factor Q, a corrected seismic image, the corrected seismic image having a higher resolution than another seismic image generated independent from using the value of the quality factor Q; and
    generating, based on the seismic image, a map of the subsurface formations.

2. The method of claim 1, wherein transforming the vertical seismic profile traces comprises transforming particle velocity data to particle displacement data.

3. The method of claim 1, wherein transforming the vertical seismic profile traces is a time-integration, equivalent to a −6 dB/octave gain and a −90 degree phase shift.

4. The method of claim 1, wherein the spectral ratio is defined by $$Q = -\pi\left(\frac{t_2 - t_1}{m}\right),$$
$$m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is a natural logarithm, and m is a log function result of the ratio of the spectral amplitudes.

5. The method of claim 4, wherein $A_1$ is a Klauder wavelet amplitude spectra at time $t_1$=0 seconds and depth $d_1$=0 meters, and $A_2$ is the amplitude spectra of the direct arrival event at time $t_2$ of a first useable downhole receiver from a ground level surface at depth $d_2$=0 meters.

6. The method of claim 1, further comprising processing surface seismic reflection data to determine the quality factor Q.

7. A system for determining a seismic quality factor Q for intervals of subsurface formations, the system comprising:
one or more processing devices; and
a memory storing instructions that, when executed by the one or more processing devices, cause the one or more processing devices to perform operations comprising:
receiving vertical seismic profile traces;
filtering the vertical seismic profile traces with an inverse impulse response of a downhole receiver;
transforming the filtered vertical seismic profile traces from particle motion measured by the downhole receiver to far-field particle motion represented by a source wavelet;
determining a spectral ratio of spectral amplitudes of a direct arrival event of the transformed vertical seismic profile traces and the source wavelet; and
generating, from the spectral ratio, a value for a quality factor Q representing an attenuation of the vertical seismic profile traces between a source at ground level surface and the downhole receiver;
generating, based on the value of the quality factor Q, a corrected seismic image, the corrected seismic image having a higher resolution than another seismic image generated independent from using the value of the quality factor Q; and
generating, based on the seismic image, a map of the subsurface formations.

8. The system of claim 7, wherein transforming the vertical seismic profile traces comprises transforming particle velocity data to particle displacement data.

9. The system of claim 7, wherein transforming the vertical seismic profile traces is a time-integration, equivalent to a −6 dB/octave gain and a −90 degree phase shift.

10. The system of claim 7, wherein the spectral ratio is defined by $$Q = -\pi\left(\frac{t_2 - t_1}{m}\right),$$
$$m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is a natural logarithm, and m is a log function result of the ratio of the spectral amplitudes.

11. The system of claim 10, wherein $A_1$ is a Klauder wavelet amplitude spectra at time $t_1$=0 seconds and depth $d_1$=0 meters, and $A_2$ is the amplitude spectra of a direct arrival event at time $t_2$ of a first useable downhole receiver from a ground level surface at depth $d_2$=0 meters.

12. The system of claim 7, wherein the operations further comprise processing surface seismic reflection data to determine the quality factor Q.

13. One or more non-transitory computer readable media storing instructions for determining a seismic quality factor Q for intervals of subsurface formations, the instructions, when executed by one or more processing devices, being configured to cause the one or more processing devices to perform operations including:
receiving vertical seismic profile traces;
filtering the vertical seismic profile traces with an inverse impulse response of a downhole receiver;
transforming the filtered vertical seismic profile traces from particle motion measured by the downhole receiver to far-field particle motion represented by a source wavelet;
determining a ratio of spectral amplitudes of a direct arrival event of the transformed vertical seismic profile traces and the source wavelet; and
generating, from the spectral ratio, a value for a quality factor Q representing an attenuation of the vertical seismic profile traces between a source at ground level surface and the downhole receiver;
generating, based on the value of the quality factor Q, a corrected seismic image, the corrected seismic image having a higher resolution than another seismic image generated independent from using the value of the quality factor Q; and
generating, based on the seismic image, a map of the subsurface formations.

14. The one or more non-transitory computer readable media of claim 13, wherein transforming the vertical seismic profile traces comprises transforming particle velocity data to particle displacement data.

15. The one or more non-transitory computer readable media of claim 13, wherein transforming the vertical seismic profile traces is a time-integration, equivalent to a −6 dB/octave gain and a −90 degree phase shift.

16. The one or more non-transitory computer readable media of claim 13, wherein the spectral ratio is defined by $$Q = -\pi\left(\frac{t_2 - t_1}{m}\right),$$
$$m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is a natural logarithm, and m is a log function result of the ratio of the spectral amplitudes.

17. The one or more non-transitory computer readable media of claim 16, wherein $A_1$ is a Klauder wavelet amplitude spectra at time $t_1$=0 seconds and depth $d_1$=0 meters, and $A_2$ is the amplitude spectra of the direct arrival event at time $t_2$ of a first useable downhole receiver from a ground level surface at depth $d_2=0$ meters.

18. The one or more non-transitory computer readable media of claim 13, further comprising processing surface seismic reflection data to determine the quality factor Q.

19. A method for determining a seismic quality factor Q for intervals of subsurface formations, the method comprising:

receiving vertical seismic profile traces;

filtering the vertical seismic profile traces with an inverse impulse response of a downhole receiver;

transforming a source wavelet from a far-field particle motion represented by the source wavelet to the far-field particle motion measured by vertical seismic profile downhole receivers;

determining a ratio of spectral amplitudes of a direct arrival event of the transformed far-field particle motions and the far-field particle motion of the vertical seismic profile traces; and generating, from the spectral ratio, a value for a quality factor Q representing an attenuation of the vertical seismic profile traces between a source at ground level surface and the downhole receiver;

generating, based on the value of the quality factor Q, a corrected seismic image, the corrected seismic image having a higher resolution than another seismic image generated independent from using the value of the quality factor Q; and generating, based on the seismic image, a map of the subsurface formations.

20. The method of claim 19, further comprising processing surface seismic reflection data to determine the quality factor Q.

* * * * *